United States Patent
Fowler et al.

(10) Patent No.: US 7,560,183 B2
(45) Date of Patent: Jul. 14, 2009

(54) CONTROL OF RH CONDITIONS IN ELECTROCHEMICAL CONVERSION ASSEMBLY

(75) Inventors: Sitima R. Fowler, Fairport, NY (US); Bernd Mueller, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 921 days.

(21) Appl. No.: 11/035,184

(22) Filed: Jan. 13, 2005

(65) Prior Publication Data

US 2006/0154124 A1   Jul. 13, 2006

(51) Int. Cl.
*H01M 8/04* (2006.01)

(52) U.S. Cl. .............. 429/13; 429/22; 429/24; 429/34

(58) Field of Classification Search ............ 429/13, 429/22, 24, 34, 38, 39
See application file for complete search history.

(56) References Cited

U.S. PATENT DOCUMENTS

| | | | |
|---|---|---|---|
| 6,711,937 B2* | 3/2004 | Richards et al. | 73/29.01 |
| 7,172,826 B2* | 2/2007 | Nomoto | 429/23 |
| 2005/0026012 A1* | 2/2005 | O'Hara | 429/22 |

OTHER PUBLICATIONS

"Current distribution measurements in a PEFC with net flow geometry", M. Noponen, J. Ihonen, A. Lundblad, G. Lindbergh, Journal of Applied Electrochemistry, pp. 255-262, 2004.

* cited by examiner

*Primary Examiner*—Stephen J. Kalafut

(57) ABSTRACT

A system and method for controlling an electrochemical conversion assembly are provided. The system is configured such that operation of one or both of the second reactant supply and the temperature controller responds to the cathode-side RH signal to a degree sufficient to maintain relative humidity within the second flowfield portion within a suitable humidification range. The suitable humidification range is a function of the degree to which the vapor barrier layers inhibit the migration of water molecules from the membrane electrode assembly.

36 Claims, 3 Drawing Sheets

CONTROL OF RH CONDITIONS IN ELECTROCHEMICAL CONVERSION ASSEMBLY

BACKGROUND OF THE INVENTION

The present invention relates to electrochemical conversion cells, commonly referred to as fuel cells, which produce electrical energy by processing first and second reactants, e.g., through oxidation and reduction of hydrogen and oxygen. By way of illustration and not limitation, a typical cell comprises a membrane electrode assembly positioned between a pair of gas diffusion media layers. A cathode flowfield plate and an anode flowfield plate are positioned on opposite sides of the cell unit, adjacent the gas diffusion media layers. The voltage provided by a single cell unit is typically too small for useful application. Accordingly, a plurality of cells are typically arranged and connected consecutively in a "stack" to increase the electrical output of the electrochemical conversion assembly or fuel cell.

BRIEF SUMMARY OF THE INVENTION

The present invention is directed to addressing performance issues attributable to membrane electrode assemblies, and the components thereof, in electrochemical conversion cells. Generally, electrochemical conversion assemblies according to the present invention can be operated without the presence of liquid water in particular flowfield portions of the assemblies and, as a result, the deleterious effects often attributable to the presence of water in fuel cell structures can be avoided. Assemblies of the present invention generally maintain sufficient humidity in the membrane electrode assembly without introducing liquid water or excessive humidity in targeted flowfield portions of the assemblies. In effect, assemblies according to the present invention enjoy the advantages of high humidity in the membrane electrode assembly while eliminating, or at least reducing, excessive humidity in flowfield portions of the electrochemical conversion cells.

In accordance with one embodiment of the present invention, a system for controlling an electrochemical conversion assembly is provided. The system comprises an electrochemical conversion assembly comprising at least one electrochemical conversion cell configured to convert first and second reactants to electrical energy. The electrochemical conversion cell comprises a membrane electrode assembly, first and second flowfield portions defined on opposite sides of the membrane electrode assembly, and respective microporous vapor barrier layers disposed between the membrane electrode assembly and the flowfield portions on opposite sides of the membrane electrode assembly. The microporous vapor barrier layers are configured to at least partially inhibit the migration of water molecules from the membrane electrode assembly.

First and second reactant supplies are configured to provide first and second reactants to opposite sides of the membrane electrode assembly via the first and second flowfield portions. A temperature controller is coupled to the electrochemical conversion assembly. A humidity sensor is configured to measure relative humidity within the electrochemical conversion assembly and provide a corresponding cathode-side RH signal indicative of the relative humidity of gas moving through the second flowfield portion. The system is configured such that operation of one or both of the second reactant supply and the temperature controller responds to the cathode-side RH signal to a degree sufficient to maintain relative humidity within the second flowfield portion within a suitable humidification range. The suitable humidification range is a function of the degree to which the vapor barrier layers inhibit the migration of water molecules from the membrane electrode assembly.

In accordance with another embodiment of the present invention, a method of controlling an electrochemical conversion assembly is provided. According to the method, the relative humidity within the electrochemical conversion assembly is measured and a corresponding cathode-side RH signal indicative of the relative humidity of gas moving through the second flowfield portion is provided. One or both of the second reactant supply and the temperature controller is operated such that it responds to the cathode-side RH signal to a degree sufficient to maintain relative humidity within the second flowfield portion within a suitable humidification range.

Accordingly, it is an object of the present invention to address performance issues attributable to membrane electrode assemblies and related components utilized in electrochemical conversion cells. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
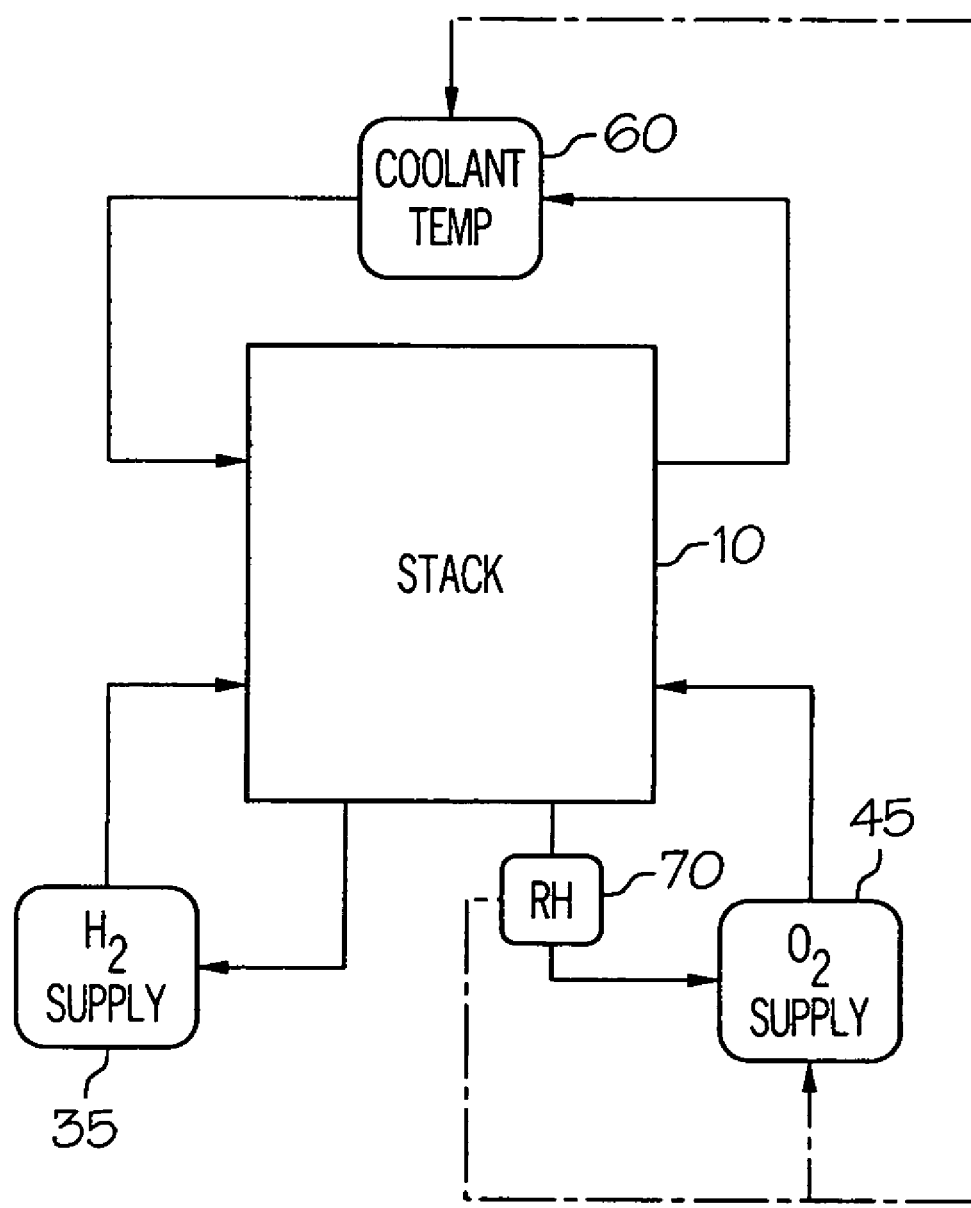
FIG. 1 is a schematic illustration of a system for optimal control of RH conditions in a fuel cell stack.
Figure 2:
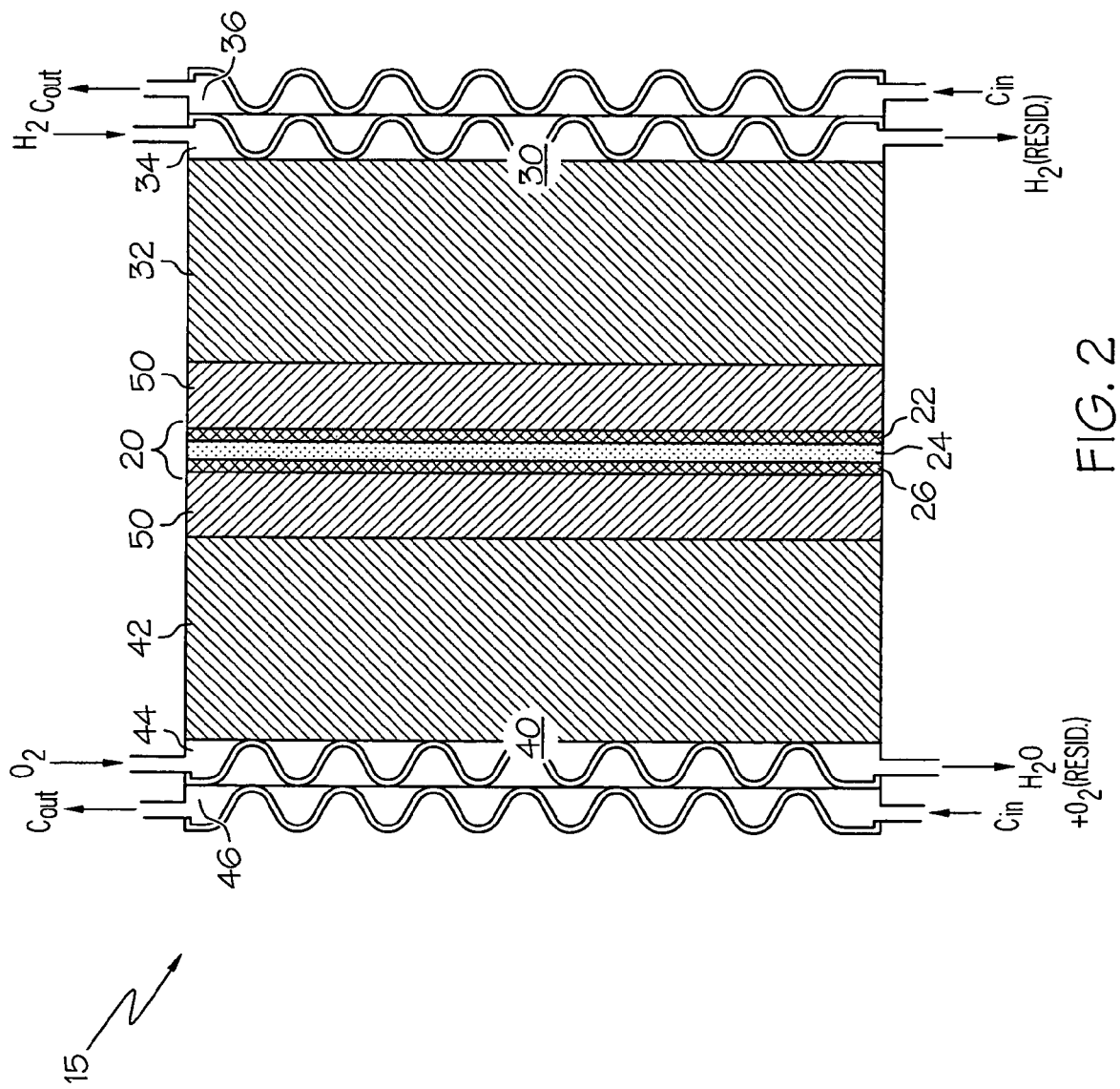
FIG. 2 is an illustration of particular components of a fuel cell stack according to one embodiment of the present invention.
Figure 3:
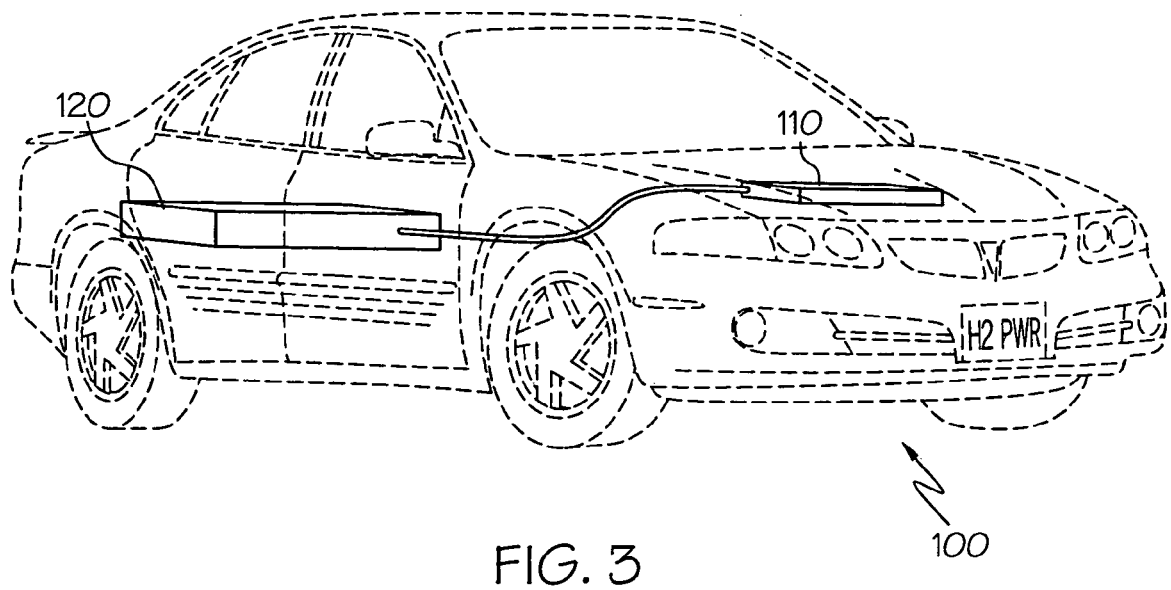
FIG. 3 is an illustration of a vehicle incorporating a fuel cell system according to the present invention.

Referring to FIGS. 1 and 2, as will be appreciated by those familiar with fuel cell system and fuel cell stack design, fuel cell systems 5 typically comprise a plurality of electrochemical conversion cells 15 arranged or "stacked" to form an electrochemical conversion assembly 10. For the purposes of describing and defining the present invention, it is noted that many of the components and functional features illustrated in FIGS. 1 and 2 are presented by way of example and not limitation, and merely relate to the general construction and operation of fuel cell systems. As such, the particulars of many components illustrated in FIGS. 1 and 2 are beyond the scope of the present invention and may be gleaned from any suitable source covering such systems.

For example, referring to the electrochemical conversion cell 15 illustrated in FIG. 2, the cell 15 is configured to convert first and second reactants $R_1$, $R_2$, to electrical energy. The illustrated cell 15 comprises a membrane electrode assembly 20 and first and second flowfield portions 30, 40 disposed on opposite sides of the membrane electrode assembly 20. Although the present invention is not limited to a particular class of membrane electrode assemblies, for the purposes of illustration, it is noted that some suitable membrane electrode assemblies 20 comprise a catalytic anode 22 formed on a first surface of a proton conducting polymer electrolyte membrane 24 and a catalytic cathode 26 formed on a second surface of the polymer electrolyte membrane 24. The anode 22 is in communication with the first reactant supply 35 (illustrated as $H_2$ in FIG. 2) while the cathode 26 is in communication with the second reactant supply 45 (illustrated as $O_2$ in FIG. 2).

Polymer electrolyte membranes are widely used in electrochemical conversion cells because they conduct protons efficiently and possess low fuel crossover properties—defining a suitable partition between reactant supplies. They are also robust enough to be assembled into a fuel cell stack and have relatively long life. One of the most common types of polymer electrolyte membranes is NAFION®, a perfluorosulfonate ionomer membrane material available from DuPont that is widely used in electrochemical conversion cells where the first reactant $R_1$ is a hydrogenous fuel source and the second reactant $R_2$ comprises oxygen or air. It is contemplated that any suitable polymer electrolyte membrane may be utilized within the scope of the present invention.

In the illustrated embodiment, the flowfield portions 30, 40 comprise gas diffusion media layers 32, 42 and respective flowfield plates 34, 44. The flowfield portions 30, 40 and gas diffusion media layers 32, 42 enhance the delivery of reactants to the associated cells. As will be appreciated with those practicing the present invention, the concepts of the present invention are not limited to cell configurations including flowfield portions of the nature illustrated in FIG. 2.

As is illustrated in FIG. 2, the electrochemical conversion cell 15 comprises the membrane electrode assembly 20 and respective microporous vapor barrier layers 50 disposed between the membrane electrode assembly 20 and the flowfield portions 30, 40 on opposite sides of the membrane electrode assembly 20. The microporous vapor barrier layers 50 are configured to at least partially inhibit the migration of water molecules from the membrane electrode assembly. For the purposes of defining and describing the present invention, it is noted that a microporous vapor barrier layer 50 will have a mean pore size diameter below about 10 µm. In some embodiments of the present invention, the microporous vapor barrier layers 50 define a mean pore size diameter substantially below about 1 µm, in some cases as low or lower than about 0.13 µm. For example, a suitable micro layer available from W.L. Gore & Associates under the trade name CARBEL™ MP30z defines a carbonized expanded polytetrafluoroethylene (ePTFE) microporous vapor barrier layer that has a mean pore size diameter of about 0.13 µm. In other embodiments of the present invention, the microporous vapor barrier layers 50 will define respective thicknesses of below about 100 µm, a mean pore size diameter of below about 1 µm, and a through plane permeability of less than about 0.01 Frazier, where the unit Frazier is measured in CFM/Sq. Ft at a differential pressure of about 0.5 inch $H_2O$, which is roughly equal to 0.01 $cm^3$/sec per $cm^2$ at a differential pressure of about 125 Pa.

Referring to the schematic illustration of FIG. 1, a temperature controller 60 is coupled to the electrochemical conversion assembly 10. As long as the temperature controller is configured to control the operating temperature of the electrochemical conversion assembly 10, its specific design is beyond the scope of the present invention. As is illustrated in FIG. 2, the temperature controller 60 may comprise a suitably controlled fluid coolant loop including first and second coolant flowfields 36, 46 formed integrally with and thermally coupled to the structure of the assembly 10.

A humidity sensor 70, also illustrated in FIG. 1, is configured to measure relative humidity within the electrochemical conversion assembly 10 and to provide a corresponding cathode-side RH signal indicative of the relative humidity of gas moving through the cathode-side flowfield portions 40 of the assembly 10. Although it is contemplated that relative humidity can be measured at a variety of positions, one convenient location is at the output of the second flowfield portion, as is illustrated in FIG. 1.

To maintain relative humidity within the second flowfield portion within a suitable humidification range, operation of either the second reactant supply 45, the temperature controller 60, or both, responds to the cathode-side RH signal provided by the humidity sensor 70. The suitable humidification range is a function of the degree to which the vapor barrier layers 50 inhibit the migration of water molecules from the membrane electrode assembly. Generally, the upper bound of the suitable humidification range varies inversely with the degree to which the vapor barrier layers 50 inhibit the migration of water molecules from the membrane electrode assembly. In effect, the vapor barrier layers 50 function to keep the relative humidity within the membrane electrode assembly 20 at an elevated level relative to the relative humidity in the second flowfield portion 40. As a result, the electrochemical conversion assembly 10 may be operated at significantly lower relative humidity values in the second flowfield portion 40—an operating condition typically yielding greater overall operational efficiency.

For example, where the fuel cell system 5 is configured such that the relative humidity in the electrochemical conversion assembly 10 would otherwise be capable of operation at a relative humidity within the second flowfield portion 40 exceeding 100%, the system is configured to maintain relative humidity in the second flowfield portion 40 at or below 100% or, more specifically, between about 75% and about 100%. In this manner, the electrochemical conversion assembly 10 can be operated without the presence of liquid water in the second flowfield portion 40 and, as a result, the deleterious effects often attributable to the presence of water in fuel cell structures can be avoided. The vapor barrier layers 50, positioned on opposite sides of the membrane electrode assembly 20, act to keep the humidity level of the membrane electrode assembly 20 at an elevated level. As a result the assembly of the present invention maintains sufficient humidity in the membrane electrode assembly 20 without introducing liquid water or excessive humidity in the second flowfield portion of the cell. In effect, assemblies according to the present invention enjoy the advantages of high humidity in the membrane electrode assembly while eliminating, or at least reducing, excessive humidity in flowfield portions of the electrochemical conversion cells.

Generally, the second reactant supply 45 can be configured to increase a stoichiometric amount of the second reactant supplied to the cathode side of the electrochemical conversion assembly 10 in response to increasing relative humidity as indicated by the cathode-side RH signal. Conversely, the second reactant supply 45 can be configured to decrease a stoichiometric amount of the second reactant supplied in response to a decrease in the cathode-side RH signal. For example, a 10% increase in the stoichiometric amount of the second reactant supplied to the cathode side of the electrochemical conversion assembly may be sufficient to account for a 10% increase in the cathode-side RH signal. Further proportional increases can be extrapolated from these values or developed through experimentation. It is contemplated that increases or decreases in the stoichiometric amount of the second reactant may be affected through control of the volumetric flow rate of the second reactant to the cathode side of the electrochemical conversion assembly 10 or through increases or decreases in the pressure at which the second reactant is supplied to the cathode side of the electrochemical conversion assembly 10.

The second reactant supply 45 can be configured to supply a specific stoichiometric amount of air to the cathode side of the electrochemical conversion assembly 10 to establish operation of the cathode flow field in a suitable humidification range. For example, in cases where the first and second reactants comprise hydrogen and air, and where operation of the system at current densities above about $0.2$ $A/cm^2$ is desired, about 1.9 times a stoichiometric amount of air can be provided to the cathode side of the electrochemical conversion assembly 10 for operation in a suitable humidification range. For operation of the system at current densities above about $0.3$ $A/cm^2$, about 1.7 times a stoichiometric amount of air can be provided to the cathode side of the electrochemical conversion assembly 10. Alternatively, or in addition, the second reactant supply can be configured to provide for suitable humidification by controlling the pressure at which the second reactant is introduced into the second flowfield portion. For example, the second reactant can be introduced at a pressure below about 165 kPa or, more specifically, at a pressure of about 150 kPa.

Generally, the temperature controller 60 can be configured to increase the temperature of the electrochemical conversion assembly 10 in response to increasing relative humidity as indicated by the cathode-side RH signal provided by the humidity sensor 70. Conversely, the temperature controller 60 can be configured to decrease the temperature of the electrochemical conversion assembly 10 in response to decreasing relative humidity, as indicated by the cathode-side RH signal. For example, the temperature controller 60 can be configured to increase the temperature of the electrochemical conversion assembly 10 by about 1° C. to about 5° C. in response to a 10% increase in the cathode-side RH signal. Further proportional increases can be extrapolated from these values or developed through experimentation.

In one embodiment of the present invention, where the first reactant comprises hydrogen and the second reactant comprises oxygen, the temperature controller 60 can be configured to control the operating temperature according to a substantially uniform progression extending from about 59° C. for operation of the electrochemical conversion assembly 10 at a current density of about $0.05$ $A/cm^2$ to about 67° C. at a current density of about $0.8$ $A/cm^2$. In another embodiment of the present invention, again where the first reactant comprises hydrogen and the second reactant comprises oxygen, the temperature controller 60 can be configured to control the operating temperature according to a substantially uniform progression extending from about 62° C. for operation of the electrochemical conversion assembly 10 at a current density of about $0.2$ $A/cm^2$ to about 65° C. at a current density of about $0.7$ $A/cm^2$.

Referring to FIG. 5, a device according to the present invention may comprise a vehicle 100 and an electrochemical conversion assembly 110 according to the present invention. The electrochemical conversion assembly 110 can be configured to at least partially provide the vehicle 100 with motive power. The vehicle 100 may also have a fuel processing system or fuel source 120 configured to supply the electrochemical conversion assembly 110 with fuel.

Although the present invention is not limited to any specific reactant compositions, it will be appreciated by those practicing the present invention and generally familiar with fuel cell technology that the first reactant supply $R_1$ typically comprises oxygen and nitrogen while the second reactant supply $R_2$ comprises a hydrogenous gas like hydrogen or methane.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. Further, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims, where the claim term "wherein" is utilized in the open-ended sense. More specifically, although some aspects of the present invention are identified herein as preferred or particularly advantageous, it is contemplated that the present invention is not necessarily limited to these preferred aspects of the invention.

What is claimed is:

1. A device comprising a system for controlling an electrochemical conversion assembly, said system comprising:
   an electrochemical conversion assembly comprising at least one electrochemical conversion cell configured to convert first and second reactants to electrical energy, said electrochemical conversion cell comprising a membrane electrode assembly, first and second flowfield portions defined on opposite sides of said membrane electrode assembly, and respective microporous vapor barrier layers disposed between said membrane electrode assembly and said flowfield portions on opposite sides of said membrane electrode assembly, wherein said microporous vapor barrier layers are configured to at least partially inhibit the migration of water molecules from the membrane electrode assembly;
   a first reactant supply configured to provide a first reactant to an anode side of said membrane electrode assembly via said first flowfield portion;
   a second reactant supply configured to provide a second reactant to a cathode side of said membrane electrode assembly via said second flowfield portion;
   a temperature controller coupled to said electrochemical conversion assembly and configured to control an operating temperature of said electrochemical conversion assembly; and
   a humidity sensor configured to measure relative humidity within said electrochemical conversion assembly and provide a corresponding cathode-side RH signal indicative of the relative humidity of gas moving through said second flowfield portion, wherein
   said system is configured such that operation of one or both of said second reactant supply and said temperature controller responds to said cathode-side RH signal to a degree sufficient to maintain relative humidity within said second flowfield portion within a suitable humidification range, and
   said suitable humidification range is a function of the degree to which said vapor barrier layers inhibit the migration of water molecules from said membrane electrode assembly.

2. A device as claimed in claim 1 wherein said system is configured such that said relative humidity in said electrochemical conversion assembly can exceed 100% but said relative humidity within said second flowfield portion of said electrochemical conversion assembly is maintained at or below 100%.

3. A device as claimed in claim 2 wherein said suitable humidification range extends from about 75% to about 100%.

4. A device as claimed in claim 1 wherein an upper bound of said suitable humidification range varies inversely with said degree to which said vapor barrier layers inhibit said migration of water molecules from said membrane electrode assembly.

5. A device as claimed in claim 1 wherein said humidity sensor is configured to provide said cathode-side RH signal to said second reactant supply.

6. A device as claimed in claim 5 wherein:
said first reactant comprises hydrogen;
said second reactant comprises air;
said second reactant supply is configured to supply about 1.9 times a stoichiometric amount of air to said cathode side of said electrochemical conversion assembly for operation of said system at current densities above about 0.2 A/cm$^2$.

7. A device as claimed in claim 6 wherein said second reactant supply is configured to provide said second reactant at a pressure below about 165 kPa.

8. A device as claimed in claim 6 wherein said second reactant supply is configured to provide said second reactant at a pressure of about 150 kPa.

9. A device as claimed in claim 5 wherein:
said first reactant comprises hydrogen;
said second reactant comprises air; and
said second reactant supply is configured to supply greater than 1.7 times a stoichiometric amount of air to said cathode side of said electrochemical conversion assembly for operation of said system at current densities above about 0.3 A/cm$^2$.

10. A device as claimed in claim 5 wherein said second reactant supply is configured to increase a stoichiometric amount of said second reactant supplied to said cathode side of said electrochemical conversion assembly in response to increasing relative humidity as indicated by said cathode-side RH signal.

11. A device as claimed in claim 10 wherein said second reactant supply is further configured to decrease a stoichiometric amount of said second reactant supplied to said cathode side of said electrochemical conversion assembly in response to an decrease in said cathode-side RH signal.

12. A device as claimed in claim 11 wherein said second reactant supply is configured to increase a stoichiometric amount of said second reactant supplied to said cathode side of said electrochemical conversion assembly by about 10% in response to a 10% increase in said cathode-side RH signal.

13. A device as claimed in claim 11 wherein said second reactant supply is configured to increase a stoichiometric amount of said second reactant supplied to said cathode side of said electrochemical conversion assembly by an amount proportional to a 10% increase in said stoichiometric amount for a 10% increase in said cathode-side RH signal.

14. A device as claimed in claim 5 wherein said second reactant supply is configured to increase a volumetric flow rate of said second reactant to said cathode side of said electrochemical conversion assembly in response to increasing relative humidity as indicated by said cathode-side RH signal.

15. A device as claimed in claim 5 wherein said second reactant supply is configured to increase a pressure at which said second reactant is supplied to said cathode side of said electrochemical conversion assembly in response to increasing relative humidity as indicated by said cathode-side RH signal.

16. A device as claimed in claim 1 wherein said temperature controller comprises fluid cooling loop thermally coupled to said electrochemical conversion assembly.

17. A device as claimed in claim 1 wherein said humidity sensor is configured to provide said cathode-side RH signal to said temperature controller.

18. A device as claimed in claim 17 wherein:
said first reactant comprises hydrogen;
said second reactant comprises oxygen;
said temperature controller is configured to control said operating temperature according to a substantially uniform progression extending from about 59° C. for operation of said electrochemical conversion assembly at a current density of about 0.05 A/cm$^2$ to about 67° C. at a current density of about 0.8 A/cm$^2$.

19. A device as claimed in claim 18 wherein said second reactant supply is configured to provide said second reactant at a pressure below about 165 kPa as said temperature is controlled along said substantially uniform progression.

20. A device as claimed in claim 18 wherein said second reactant supply is configured to provide said second reactant at a pressure of about 150 kPa as said temperature is controlled along said substantially uniform progression.

21. A device as claimed in claim 17 wherein:
said first reactant comprises hydrogen;
said second reactant comprises oxygen;
said temperature controller is configured to control said operating temperature according to a substantially uniform progression extending from about 62° C. for operation of said electrochemical conversion assembly at a current density of about 0.2 A/cm$^2$ to about 65° C. at a current density of about 0.7 A/cm$^2$.

22. A device as claimed in claim 17 wherein said temperature controller is configured to increase the temperature of said electrochemical conversion assembly in response to increasing relative humidity as indicated by said cathode-side RH signal.

23. A device as claimed in claim 22 wherein said temperature controller is further configured to decrease the temperature of said electrochemical conversion assembly in response to an decrease in said cathode-side RH signal.

24. A device as claimed in claim 22 wherein said temperature controller is configured to increase the temperature of said electrochemical conversion assembly by about 1° C. to about 5° C. in response to a 10% increase in said cathode-side RH signal.

25. A device as claimed in claim 22 wherein said temperature controller is configured to increase the temperature of said electrochemical conversion assembly by an amount proportional to an increase of about 1° C. to about 5° C. for a 10% increase in said cathode-side RH signal.

26. A device as claimed in claim 1 wherein:
said humidity sensor is configured to provide said cathode-side RH signal to said second reactant supply and said temperature controller;
said first reactant comprises hydrogen;
said second reactant comprises air;
said second reactant supply is configured to supply about 1.9 times a stoichiometric amount of air to said cathode side of said electrochemical conversion assembly for operation of said system at current densities above about 0.2 A/cm$^2$;
said temperature controller is configured to control said operating temperature according to a substantially uniform progression extending from about 59° C. for operation of said electrochemical conversion assembly at a current density of about 0.05 A/cm² to about 67° C. at a current density of about 0.8 A/cm²; and said system is configured to increase at least one of (i) a stoichiometric amount of air supplied to said cathode side of said electrochemical conversion assembly in response to increasing relative humidity as indicated by said cathode-side RH signal and (ii) the temperature of said electrochemical conversion assembly in response to increasing relative humidity as indicated by said cathode-side RH signal.

27. A device as claimed in claim 26 wherein said system is configured to increase both said stoichiometric amount of air supplied to said cathode side of said electrochemical conversion assembly and said temperature of said electrochemical conversion assembly in response to increasing relative humidity as indicated by said cathode-side RH signal.

28. A device as claimed in claim 1 wherein said microporous vapor barrier layers define a mean pore size diameter substantially below about 10 μm.

29. A device as claimed in claim 1 wherein said microporous vapor barrier layers define a mean pore size diameter substantially below about 1 μm.

30. A device as claimed in claim 1 wherein said microporous vapor barrier layers comprise expanded PTFE defining a mean pore size diameter substantially below about 1 μm.

31. A device as claimed in claim 1 wherein said microporous vapor barrier layers define respective thicknesses of below about 100 μm, a mean pore size diameter of below about 1 μm, and a through plane permeability of less than about 0.01 Frazier (CFM/Sq. Ft at a differential pressure of about 0.5 inch $H_2O$).

32. A device as claimed in claim 1 wherein said humidity sensor is configured to measure relative humidity at an output of said second flowfield portion.

33. A device as claimed in claim 1 wherein said device further comprises a vehicle and said electrochemical conversion assembly cell serves as a source of motive power for said vehicle.

34. A device comprising a system for controlling an electrochemical conversion assembly, said system comprising:
an electrochemical conversion assembly comprising at least one electrochemical conversion cell configured to convert first and second reactants to electrical energy, said electrochemical conversion cell comprising a membrane electrode assembly, first and second flowfield portions defined on opposite sides of said membrane electrode assembly, and respective microporous vapor barrier layers disposed between said membrane electrode assembly and said flowfield portions on opposite sides of said membrane electrode assembly, wherein said microporous vapor barrier layers are configured to at least partially inhibit the migration of water molecules from the membrane electrode assembly;
a first reactant supply configured to provide hydrogen to an anode side of said membrane electrode assembly via said first flowfield portion;
a second reactant supply configured to provide air to a cathode side of said membrane electrode assembly via said second flowfield portion;
a temperature controller coupled to said electrochemical conversion assembly and configured to control an operating temperature of said electrochemical conversion assembly; and
a humidity sensor configured to measure relative humidity within said electrochemical conversion assembly and provide a corresponding cathode-side RH signal to said second reactant supply and said temperature controller, wherein said cathode-side RH signal is indicative of the relative humidity of gas moving through said second flowfield portion;

said system is configured such that said relative humidity in said electrochemical conversion assembly can exceed 100% but said relative humidity within said second flowfield portion of said electrochemical conversion assembly is maintained at or below 100%, said second reactant supply is configured to supply about 1.9 times a stoichiometric amount of air to said cathode side of said electrochemical conversion assembly for operation of said system at current densities above about 0.2 A/cm², said temperature controller is configured to control said operating temperature according to a substantially uniform progression extending from about 59° C. for operation of said electrochemical conversion assembly at a current density of about 0.05 A/cm² to about 67° C. at a current density of about 0.8 A/cm² so as to maintain relative humidity at a value that is a function of the degree to which said vapor barrier layers inhibit the migration of water molecules from said membrane electrode assembly, said system is configured to increase at least one of (i) a stoichiometric amount of air supplied to said cathode side of said electrochemical conversion assembly in response to increasing relative humidity as indicated by said cathode-side RH signal and (ii) the temperature of said electrochemical conversion assembly in response to increasing relative humidity as indicated by said cathode-side RH signal.

35. A method of controlling an electrochemical conversion assembly comprising at least one electrochemical conversion cell configured to convert first and second reactants to electrical energy, said method comprising:
supplying a first reactant to an anode side of a membrane electrode assembly of said electrochemical conversion assembly;
supplying a second reactant to a cathode side of said membrane electrode assembly;
controlling an operating temperature of said electrochemical conversion assembly;
measuring relative humidity within said electrochemical conversion assembly and providing a corresponding cathode-side RH signal indicative of the relative humidity of gas moving through said second flowfield portion;
operating one or both of said second reactant supply and said temperature controller such that it responds to said cathode-side RH signal to a degree sufficient to maintain relative humidity within said second flowfield portion within a suitable humidification range, wherein said suitable humidification range is a function of the degree to which respective microporous vapor barrier layers disposed on said anode and cathode sides of said membrane electrode assembly inhibit the migration of water molecules from said membrane electrode assembly.

36. A method as claimed in claim 35 wherein one or both of said second reactant supply and said temperature controller are operated such that substantially no liquid water is present within said second flowfield portion.

* * * * *